_United States Patent_

Fitzgerald

[15] 3,634,934
[45] Jan. 18, 1972

[54] MANUFACTURE OF COMPOSITE MATERIALS

[72] Inventor: William M. B. Fitzgerald, Toronto, Ontario, Canada

[73] Assignee: Johnson Matthey and Mallory, Ltd., Toronto, Canada

[22] Filed: Dec. 26, 1968

[21] Appl. No.: 786,971

Related U.S. Application Data

[63] Continuation-in-part of Ser. No. 507,173, Nov. 10, 1965, abandoned.

[52] U.S. Cl.........................29/630 C, 10/27 R, 29/630 R, 29/470.1 R, 140/111 R, 219/103 R, 219/104 R, 228/3 R, 228/4 R
[51] Int. Cl................................................H01r 9/00
[58] Field of Search..................29/630 C; 10/27, 27 A; 140/111, 112; 219/103; 228/3, 4

[56] References Cited

UNITED STATES PATENTS

| 1,733,263 | 10/1929 | Hoopes | 10/27 |
| 3,042,786 | 7/1962 | Babcock | 10/27 A |
| 3,371,414 | 3/1968 | Gwyn, Jr. | 10/27 X |
| 3,460,735 | 8/1969 | Shibata | 10/27 X |

FOREIGN PATENTS OR APPLICATIONS

| 1,243,746 | 9/1960 | France | 10/27 |
| 1,135,272 | 3/1959 | Germany | 10/27 |

Primary Examiner—John F. Campbell
Assistant Examiner—Robert W. Church
Attorney—Richard H. Childress, Robert F. Meyer and Henry W. Cummings

[57] ABSTRACT

A welded composite formed by cutting and heating continuous lengths of wire and immediately transferring the lengths to a die where the lengths are joined by pressing at high pressure and the joined lengths are then forced at least a portion of the way out of the die where heading operations are performed.

6 Claims, 33 Drawing Figures

INVENTOR
WILLIAM M. B. FITZGERALD
BY Robert F. Meyer
ATTORNEY

INVENTOR
WILLIAM M. B. FITZGERALD
BY Robert J. Fryer
ATTORNEY

INVENTOR
WILLIAM M. B. FITZGERALD
BY Robert Trupper
ATTORNEY

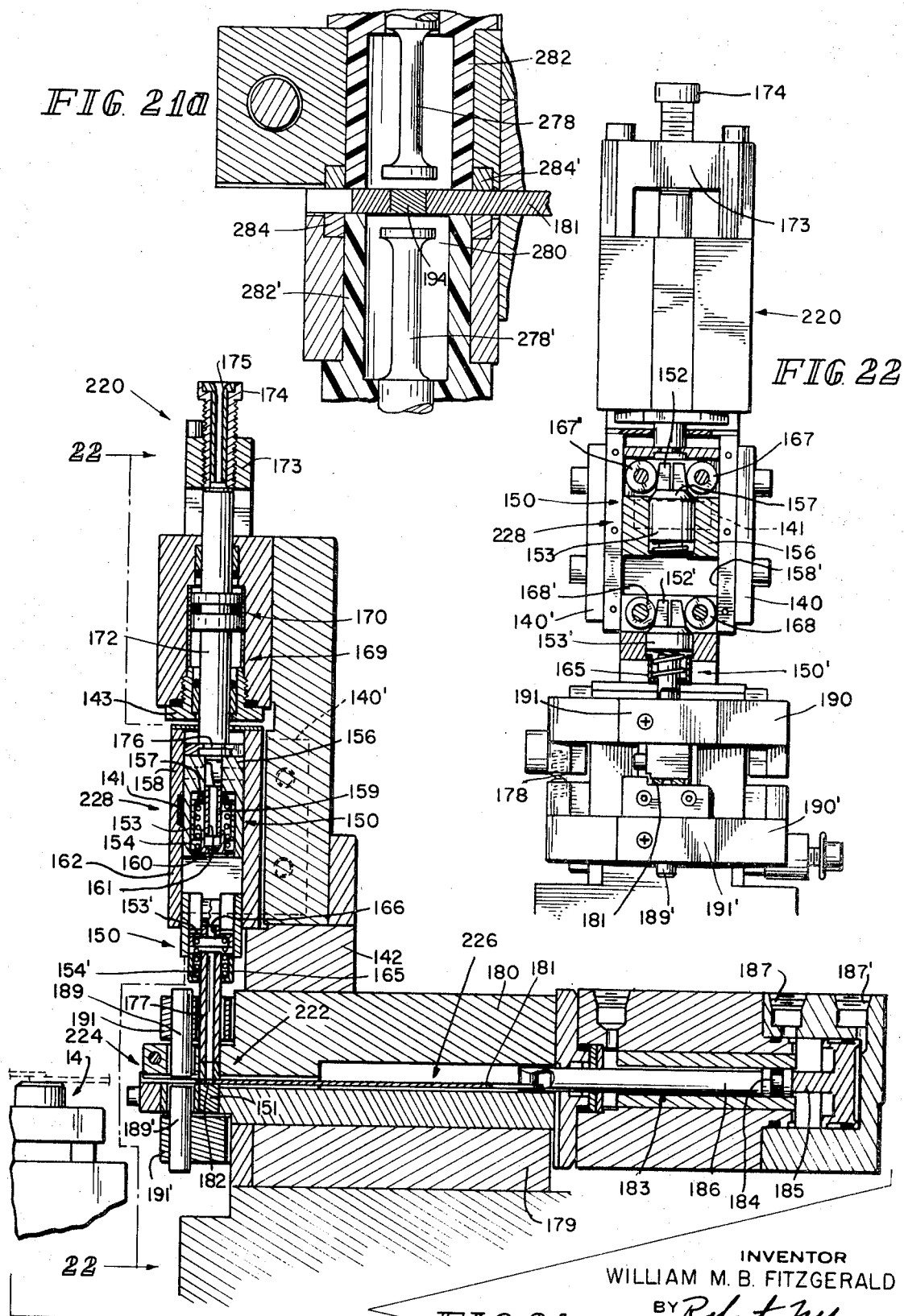

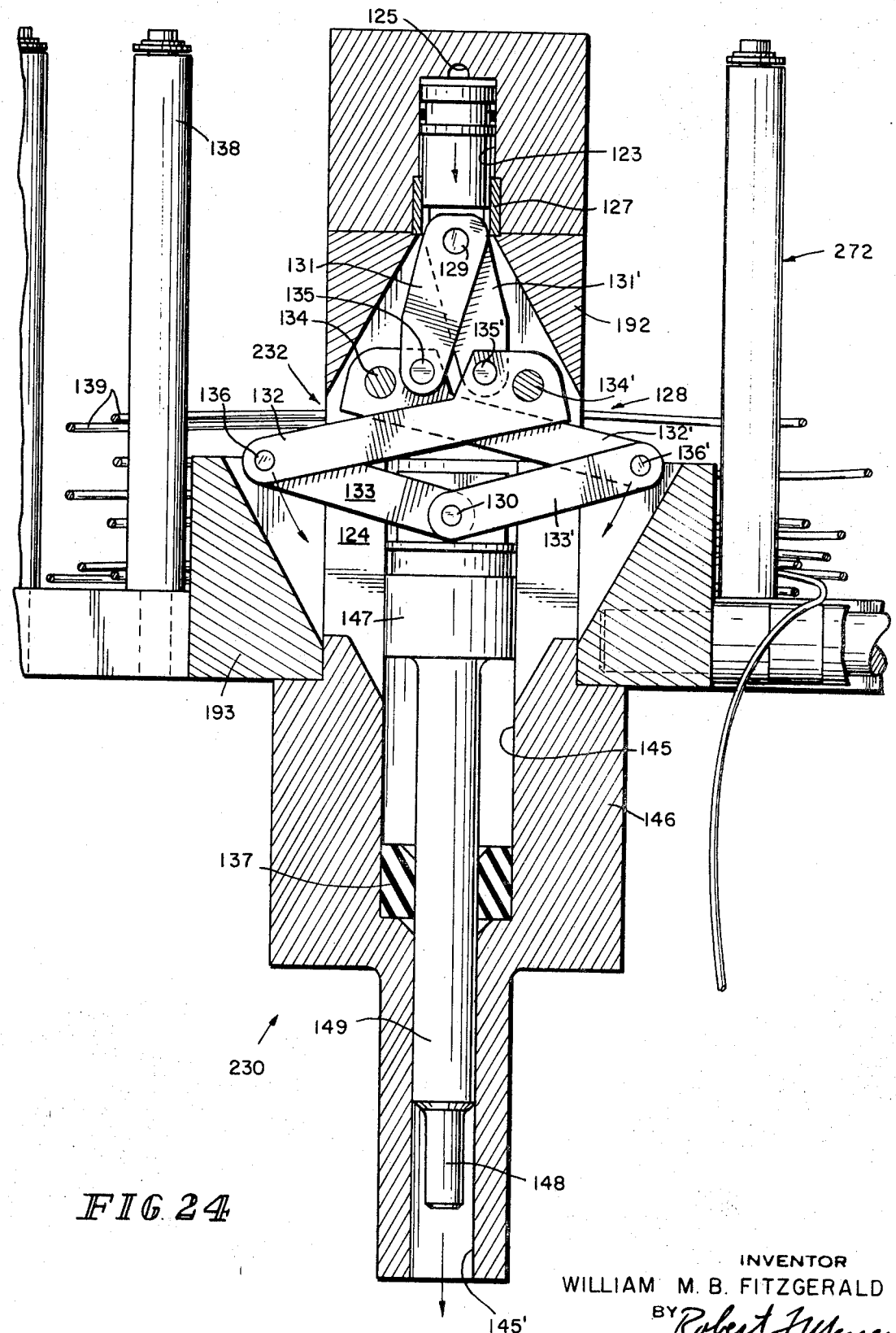

MANUFACTURE OF COMPOSITE MATERIALS

This is a continuation-in-part of application, Ser. No. 507,173 filed Nov. 10, 1965 and now abandoned in the name of William M. B. Fitzgerald.

This invention relates to an improved method of welding a metal facing to a base metal to form a composite headed contact, and to a machine for carrying out such method. The method of the present invention is particularly applicable to making rivet-type composites having the shank and part of the head thereof fabricated from one metal and the face thereof having a layer of another metal or an alloy of the metal. It is also believed that the present invention would be applicable to trimetal composites wherein a layer of one metal is sandwiched between other metals or alloys of metals.

In the manufacture of electrical contacts, use is being frequently made of composite contacts wherein the contacts are manufactured of a low-cost base metal and a relatively higher cost material for the electrical contact material. For example, composite rivet-type electrical contacts are manufactured wherein the shank of the rivet and part of the head are manufactured from a good thermally and electrically conductive material such as copper, aluminum, and magnesium with the face of the head being fabricated from a material which is also electrically and thermally conductive and is also resistant to oxidation such as silver or silver-cadmium oxide.

Because of the rising prices of materials such as silver, such composite contacts are being more abundantly used. Consequently, industry is constantly seeking means and methods for making such contacts. Among the problems associated with the making of such contacts is that of achieving a good uniform contact face on the head with a good bond between the contact face and the base metal. Such problems become particularly acute with regard to the use of silver-cadmium oxide as the contact face material. Silver-cadmium oxide becomes increasingly difficult to bond to the base metal, such as copper, as the amount of cadmium oxide increases.

Furthermore, in order to take advantage of the lower cost materials, the composite contacts must, of necessity, be made at high-production rates with good quality and with close tolerances.

The present invention is concerned with the fabrication of composite articles of manufacture, more particularly, composite rivet-type contacts, and has as one of its objects the provision of a method of producing such articles.

Another object is the provision of a method of welding such articles wherein a facing is formed as part of the head of a rivet-type article with the facing being joined to a base metal and then subsequently headed to form the final article.

Still another object of the invention is the provision of such a method wherein a uniform layer of such facing is achieved.

Yet another object of the invention is the provision of such a method wherein the layer being joined to the base metal is formed with a greater thickness at the periphery prior to the heading step.

Still another object of the invention is the provision of such a method wherein the base metal and the facing metal is heated prior to joining.

A further object of the invention is the provision of such a method wherein the temperature of the base metal and the facing metal is regulated to achieve a desired facing configuration.

Still another object of the invention is to provide such a method wherein the welding is achieved through rapid impact of pressure.

Another object of the invention is to provide such a method wherein the ends of wire of predetermined length are welded together.

A further object of the invention is to provide such a method wherein there is substantially no flow of the metals at the joint when the wires are joined.

Another object of the invention is the provision of such a method which is carried out in a vacuum.

Yet another object of the invention is the provision of a machine for making the article.

A further object of the invention is the provision of a machine for making the article at a high production rate.

Another object of the invention is to provide such a machine which is hydraulically operated in accordance with a programmed sequence.

Still another object of the invention is the provision of such a machine wherein there are means to heat, cut and feed wire stock to a centrally located work station.

Another object of the invention is to provide such a machine wherein the work station includes axial positioning means and support means.

Another object of the invention is to provide such a machine wherein hydraulic fluid is fed to various elements of the machine through an actuator means energized by a hydraulic programmer coupled to the actuator.

Another object of the invention is to provide an actuator means including a chamber of fluid under pressure, passages communicating with an element of the machine to be actuated, and means controlling the fluid to the passages.

Another object of the invention is to provide a hydraulic programmer including a chamber of fluid under pressure, outlet means communicating with the chamber, and programming means selectively opening and closing the outlet means.

Yet another object of the invention is to provide such a machine wherein an impact means is rapidly moved through a lever system to force predetermined lengths of wire into a support means and to join the wires by impact in a single continuous stroke.

Still another object of the invention is the provision of a wire feed means utilizing a piston arrangement for selectively feeding wire.

Another object of the invention is the provision of a ram means utilizing a travel multiplier means.

Another object of the invention is to provide a hydraulic valve means to control the volume of fluid to an element being actuated.

Another object of the invention is to provide a hydraulic valve means to control the pressure of a fluid to an element being actuated.

These and other objects and the nature thereof will become apparent from the following description taken in conjunction with the accompanying drawings wherein like reference numbers describe elements of a similar function.

IN THE DRAWINGS

FIG. 21 is a cross section of the wire supply means of the machine of FIG. 15.

FIG. 21A is a cross section of another embodiment of the heating means illustrated in FIG. 21.

FIG. 22 is a view taken along line 22—22 of FIG. 21.

FIG. 24 is a cross section of the ram means of the machine of FIG. 15.

Figure 1:
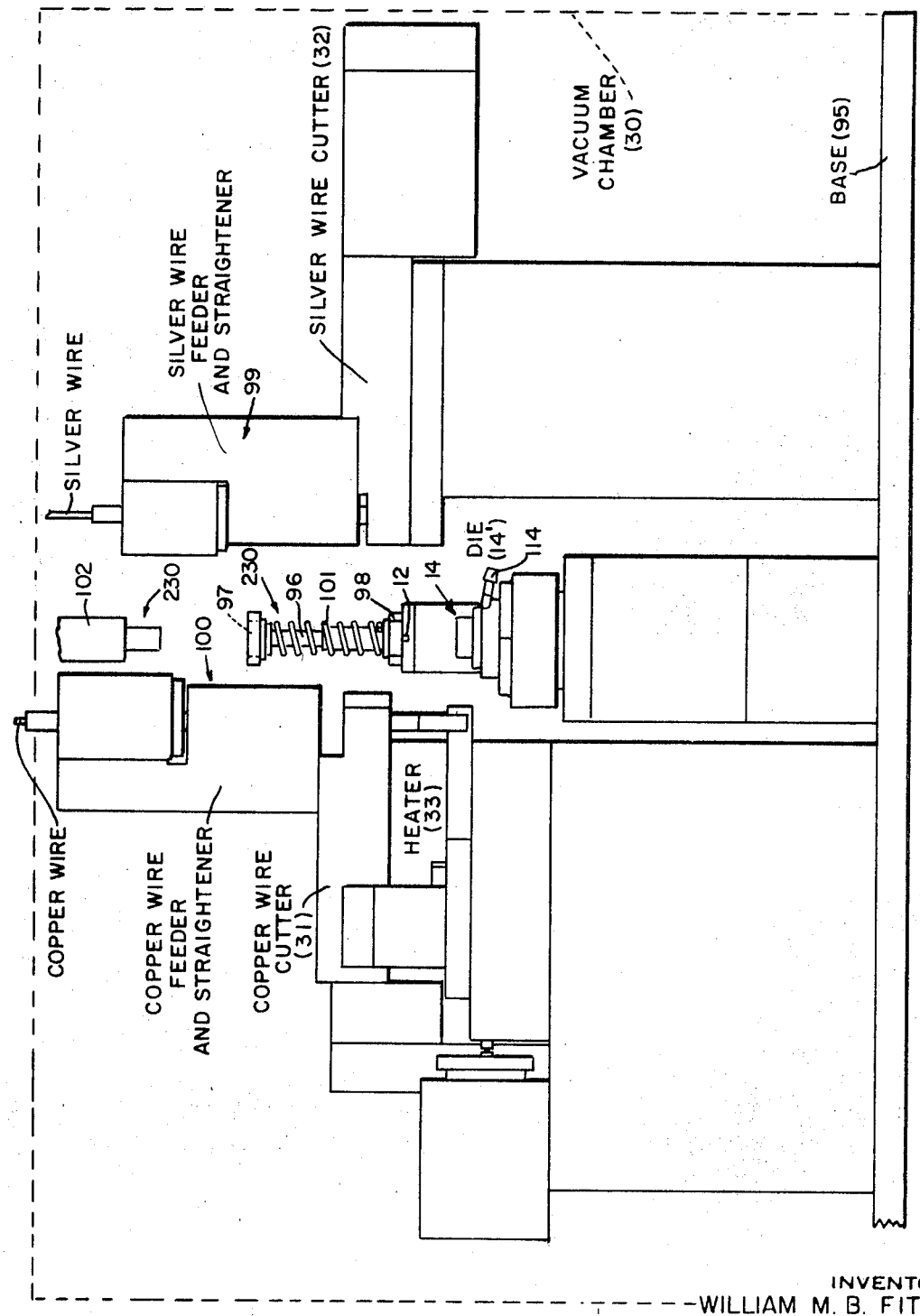
FIG. 1 is a schematic view showing outlines of tools to feed, straighten and cut the copper wire, to transfer the cut portions of wire to a die and to pressure weld them together.
Figure 3:
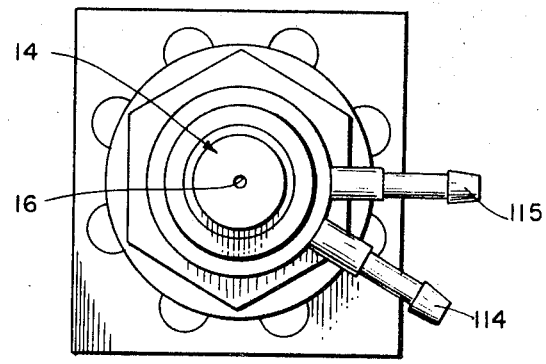
FIG. 3 is a top view of the means illustrated in FIG. 2.

While the invention will be described with reference to the manufacture of electrical contacts, it should be understood that the invention need not be so limited and that the purpose of the invention is to produce composite articles having a head and a shank wherein the head is composed of different materials.

According to the present invention, the metals comprising the electrical contact are cut from continuous lengths of wire and then immediately transferred to a centrally disposed work station where the metals are joined by pressing them together quickly at high pressure. The process is completed at the same work station by forming the welded metals under pressure into a rivet or composite disc. One or more of the metals may be heated to assist in the joining process. All the operations may be carried out in a vacuum or in a protective atmosphere to ensure uncontaminated and oxide-free joints between the several metals of the contact.

According to a further feature of the present invention, the operations of uncoiling the wires, straightening the wires when necessary, shearing the wires into accurate lengths, heating one or more of the lengths of wire, joining several of the lengths of wire and forming the resulting composite rod to the required final shape are performed simultaneously and successively according to a repeating sequence in the same machine.

According to still further features of the present invention, the operation of welding, indenting the shank when required and forming the composite rod into the required final shape are all performed while the rod is in or partly in the confines of the work station. For this purpose the work station is mounted in a central position on a horizontal slab of metal and various tools are placed radially around the die. Means are provided to advance each tool to a position over the die. The tool performs its required function on the composite rod and then is withdrawn to make way for the next operation. Suitable means are provided to cool the die and the various tools surrounding it. Power for performing the function of each tool is provided by an overhead ram means mounted on the same axis as the work station. The ram means is propelled downwards along the axis of the station at high velocity to successively actuate the tools which perform the operations of welding and forming the contact.

In carrying out the process of the invention, wires of a predetermined length of electrically and thermally conductive and oxidation-resistant material taken from the group consisting of silver, silver-cadmium oxide, gold, platinum, paladium, and alloys thereof, is molecularly bonded to a wire of a predetermined length of an electrically and thermally conductive metal taken from the group consisting of copper, aluminum, magnesium, steel and alloys thereof to form a composite rod and the the composite rod is headed to form a rivet-type article. The materials are molecularly bonded together very rapidly such that the material's grain structure is undamaged. A uniform layer of the electrically and thermally conductive and oxidation-resistant material may be assisted by forming a cup-shaped end portion on the material as the composite is formed. Further, the temperature of both materials may be kept below the eutectic, with the temperatures of the wires being varied to control the contour of the layer.

As will become apparent as the description proceeds, the joining of the wires takes place at a centrally located work station having a support means, or a die, the diameter of which is only slightly larger than the diameter of the wires. The head is then formed outside the die. Thus there is substantially no displacement of the metals at the joint, and a more uniform contact layer is achieved. Also, as will become apparent, high mass-production rates with good quality contacts are achieved by performing all of the operations at a central work station with the materials being forced into the station and joined by a single application of pressure, such pressure being rapidly applied as an impact stroke. Prior art means and methods, whereby different functions are performed at different stations with the machine indexing from station to station, are for the most part slower and in addition, alignment of the materials was difficult to achieve thus causing production problems.

Figure 2:
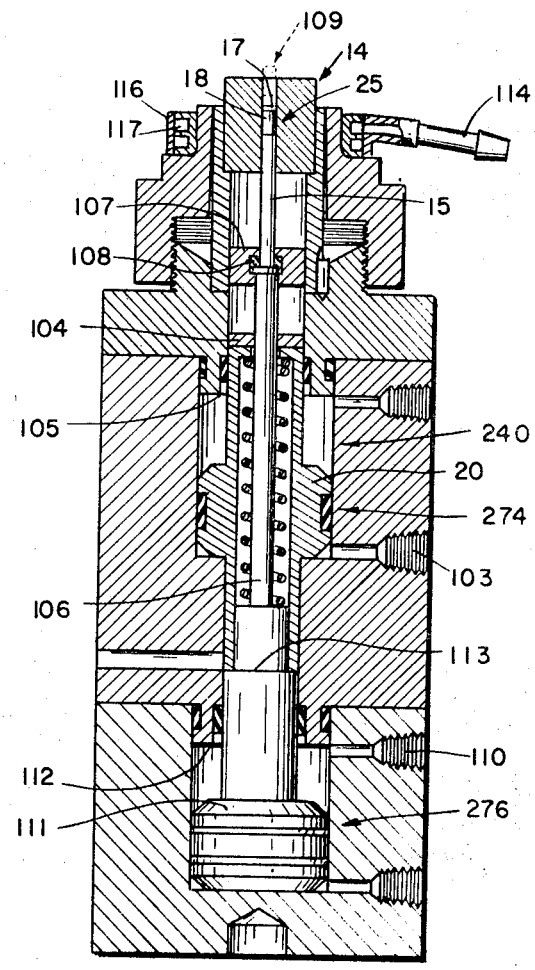
FIG. 2 is a cross-sectional view through a die holder showing means to raise and locate the pressure welded portion to the required height and also showing a cooling ring.
Figure 4:
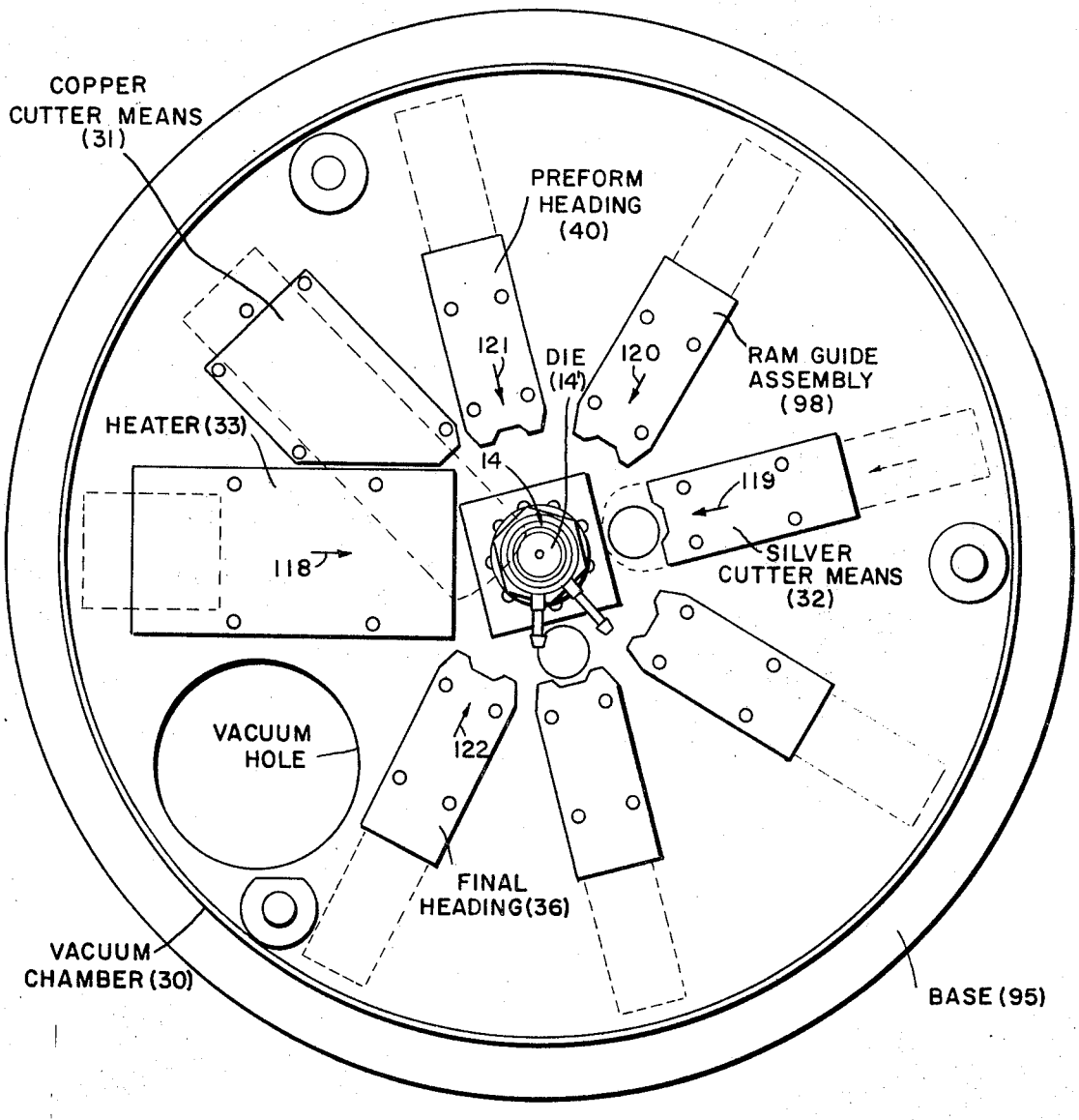
FIG. 4 is a top view showing how the various tools may be disposed around the die and also showing the vacuum suction hole and three pillars which support the upper works of the machine.
Figure 5:
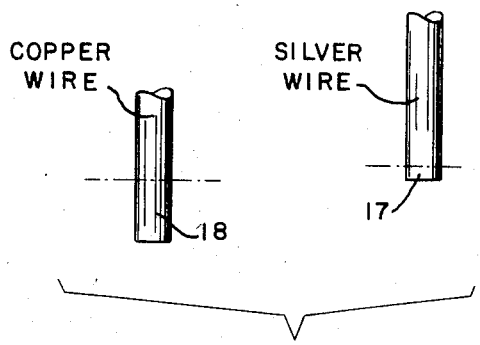
FIGS. 5 to 14 illustrate various phases of the method of operation of the present invention.
Figure 6:
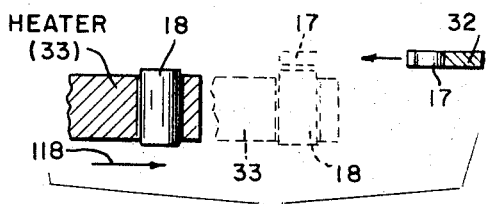
Figure 7:
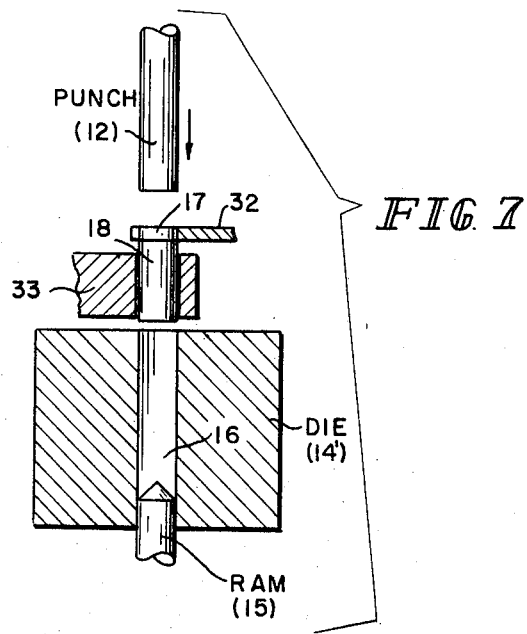

Referring now to FIGS. 1–15, and particularly FIGS. 1, 2 and 4, which illustrate a version of a machine according to the present invention, wire of a material such as copper is withdrawn from a coil of copper wire (not shown) by a combined feeding, measuring and straightening device 100. The continuous length of copper wire is heated and sheared by a cutter means 31 into a short and accurately measured length 18. The copper length 18 passes from the cutter directly into a heating device 33, which heats and moves the copper length in the direction of arrow 118 to a position over a centrally located work station 14 including a support means such as a carbide die 14' whose diameter is nearly the same as that of the finished stem of the rivet-type contact 43. Alternately, as will be apparent as the description proceeds, the wire could be heated and sheared simultaneously in a combination heating and cutting means.

Figure 8:
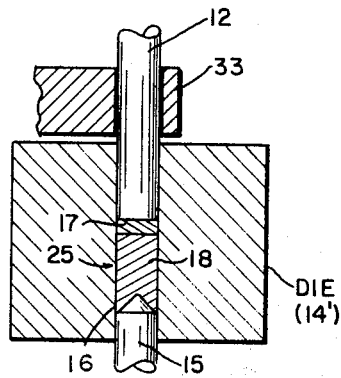
Figure 9:
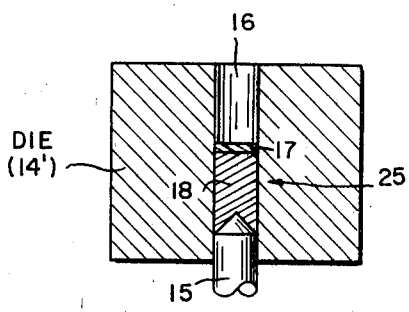
Figure 10:
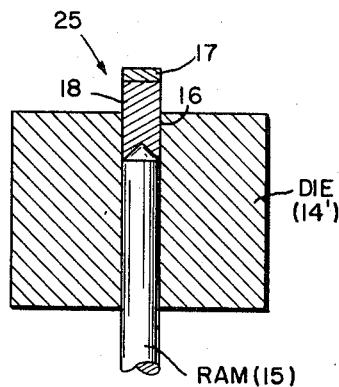

Meanwhile, a closely exact length from a coil of wire suitable for electrical contacts, such as silver or silver-cadmium oxide, is fed by a device 99, similar to the feeding, measuring and straightening device 100 employed for the copper wire to a cutter means 32 and sheared. The continuous length of silver wire is sheared by a silver cutter means 32 so as to form a silver disc 17. The silver disc is carried by the cutter blade 32A in the direction of arrow 119 to a position directly above the heated copper length of wire. Again, the heating and shearing could be performed simultaneously. Meanwhile, a guide assembly 98, holding a carbide punch 12, is displaced in the direction of arrow 120 to a position directly above the die hole 16 of die 14' included as part of the centrally located work station 14. At the required instant of time during the fabrication of the rivet-type contact, a weight 102 is impelled rapidly downwards along the extended axis line of the die 14', and passes through a hole 97 in the guide assembly 98 and strikes the punch holder 96, carries it and the punch down so that the punch 12 strikes the silver disc forcing it against the copper length and transferring both pieces into the aforementioned carbide die hole 16. The punch 12 continues to impel the silver disc and the copper length downwardly until they come to rest against an axial positioning means 240 which includes a carbide ram 15. The carbide ram is machined to imprint the required shape to the shank of the rivet-type contact. The kinetic energy remaining stored in the weight 102 and carbide punch assembly then forces the two metals together as shown in FIG. 8. The carbide punch instantly rebounds out of the die with assistance from a spring 101, leaving silver disc 17 pressure welded to the copper length as shown in FIG. 9 sufficiently to hold the wire length and disc together to form a composite rod.

Figure 11:
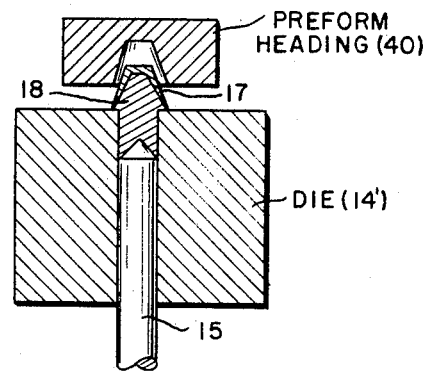
Figure 12:
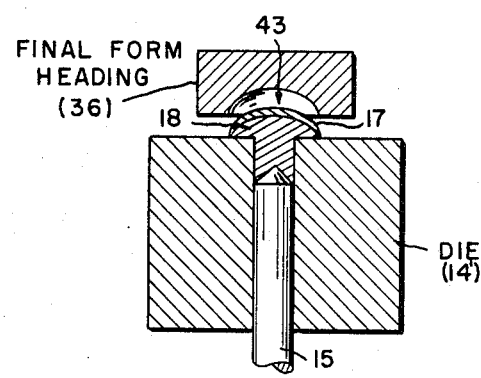
Figure 13:
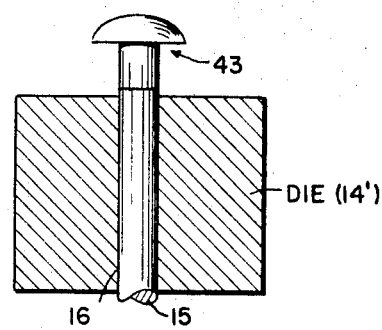
Figure 14:
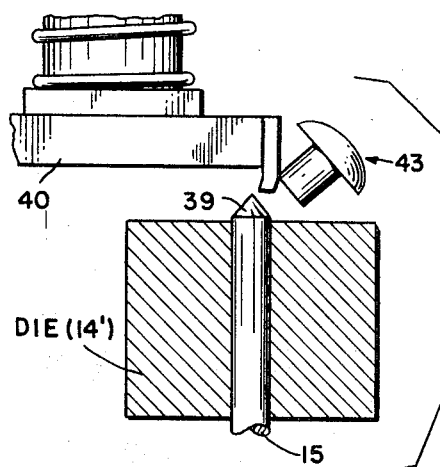

Referring now to FIG. 2 of the drawings, which shows a joined composite rod 25 formed of the silver disc 17 and the copper length 18 in the die hole 16 after the punch 12 has withdrawn, high-pressure oil is made to enter the port 103 under a sufficiently high pressure to force the piston 20 of axial positioning means 240 all the way up until it is brought to rest against the top of the cylinder 105. The rod 106 meanwhile remains stationary until the spacers 104 abut against the split housing 107. Continued displacement of the piston lifts the whole assembly consisting of rod 106, housing 107, carrier ring 108 and ram or knockout pin 15, so that the composite rod 25 partly protrudes beyond the die as shown by the dotted lines 109 of FIG. 2. At this stage, operations are performed upon the protruding composite rod 25 such as are depicted in FIGS. 11 and 12, by tools which are moved in the direction of arrows 121 and 122 and acted upon as before by momentum stored in the weight 102 which strikes tools 40 and 36 through holes similar to 97 held in guide assemblies similar to 98. The length of the composite rod 25 that protrudes is a function of the total thickness of spacers 104. After the head is completed, high-pressure oil is made to enter orifice 110, and raise the piston assembly 111 of axial positioning means 240 and it will rise until the top of the piston abuts against the cylinder top 112; on its way up, the piston rod top face 113 comes against rod 106 in the position where it was left by the previous operation and lifts it all the rest of the way until the ram 15 reaches the position shown in FIG. 14. Finally, the rivet-type contact is ejected from the die and removed to a storage space by a projection on the end of the preform heading tool 40 which is advanced a second time for this purpose.

All these operations are performed automatically, sequentially and simultaneously, according to a master program and in the confines of a vacuum chamber 30.

A cooling liquid is circulated through the cooling ring 116 via passages 114, 115 and 117, and a viscous fluid is introduced into the interstices between the cooling ring and the die to help the passage of heat. The base 95 is water cooled and the various tools are mounted on massive blocks of copper alloy to help conduct heat thereto.

In carrying out the process of the invention, it is noted that the lengths of wire are joined together in a die means or a support means which has a diameter only slightly larger than the diameter of the wires. Or to put it another way, the wires are joined in a confining space only slightly larger than the diameter of the wire. Thus there is substantially no flow of metal transverse to the axis of the wire. Without such flow of metal, it has been found that a more uniform layer of contact metal on the head, especially at the outer periphery of the layer, is more readily achieved.

Figure 27:
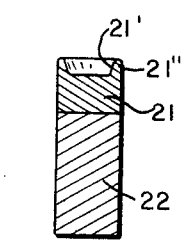
FIGS. 27–30 are cross sections of the composite rod formed by the machine of FIG. 15 at various stages of formation.

This problem of providing a more uniform layer, especially with regard to the outer periphery of the layer, may be further met by using a dome-shaped head for the punch 12 such that a cup-shaped configuration is formed at the end of the silver disc, opposite the bond. Such configuration is shown in FIG. 27 wherein there is shown a silver disc 21 bonded to a length of copper wire 22, with the disc having a cup-shaped end portion 21'. With such a configuration, when the subsequent heading operation is performed, the lip 21'' will aid in insuring that a sufficient amount of silver is available at the outer periphery to insure a uniform layer.

Another problem that is associated with the present process is that of maintaining the grain quality of the composite. Generally speaking, materials such as silver-cadmium oxide alloys have a tendency to be brittle, especially when subjected to pressure-forming such as pressure heading. This is especially true for silver-cadmium oxide where the cadmium oxide is an amount of about 15 percent by weight. To this end, the present invention forms the composite rod by first heating the materials to be joined to a high temperature for subsequent welding of the materials substantially instantaneously. Such temperature may be below the eutectic temperature of the materials. That is, the speed of the punch or the heading tool is such that the joint and/or the formed head is very quickly made. With the weld being substantially instantaneously made, there is less chance of heat loss from the prior heating of the materials. Thus by heating the materials to be joined and headed and then very quickly joining and heading the materials, good ductility and freedom from final crack in the materials is achieved. In the process of the present invention, speeds of from about 20–30 feet/second have been found suitable. That is, the weld is made quickly enough to achieve good ductility and yet the speed is not excessive such that a good weld could not be obtained.

By maintaining the temperature below the eutectic temperature of the material there is substantially no alloying between the layer and the base metal such that there is achieved a molecular bond between the two.

Figure 28:
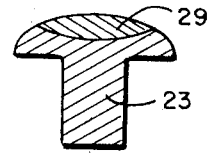
Figure 29:
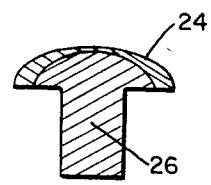
Figure 30:
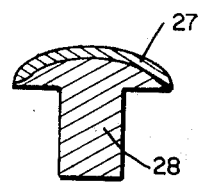

It has also been found that the uniformity of the layer and its contour can be controlled by adjusting the relationship of the temperature of the materials. As shown in FIG. 28 where the layer 29 after heading appears to be more or less centered in the head of the rivet and convexed inwardly, then the layer needs to be softer in relation to the base metal 23 for better flow outward toward the periphery and less penetration into the base metal. Thus the temperature of the layered material would have to be adjusted upwardly and/or the base metal temperature would have to be adjusted downwardly. In FIG. 29 there is shown a head wherein the layer 24 has assumed a contour wherein the layer is very thin at the crown of the rivet head and relatively thick at the outer periphery. Under this condition, the temperature would need to be adjusted to make the layer material harder in relation to the base metal 26, or in other words, the temperature adjustment would be the opposite of that with respect to FIG. 28. FIG. 30 shows a layer 27 bonded to base metal 28 wherein the temperatures have been properly adjusted and the cup-shaped portion 21 of FIG. 27 has been used to give a substantially uniform layer.

Figure 15:
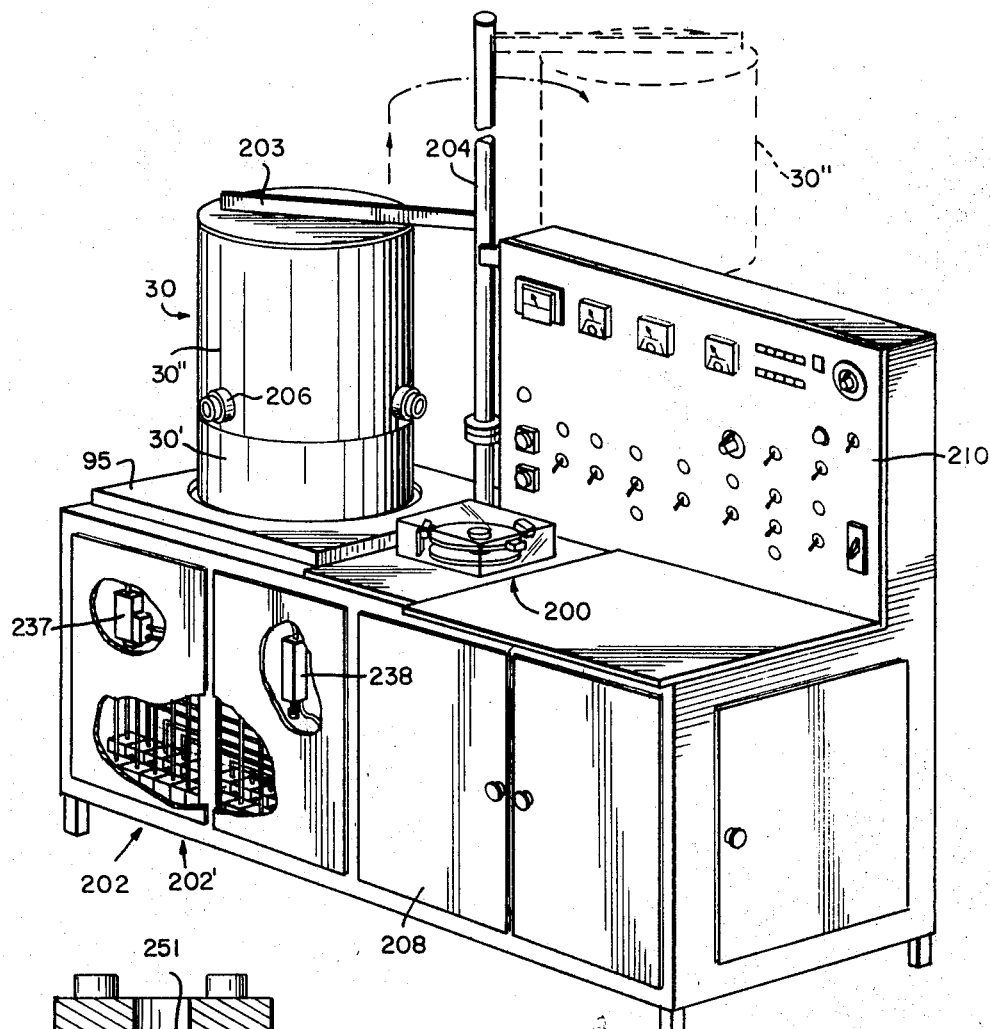
FIG. 15 is a perspective view of a particular machine for carrying out the invention.

Referring now to FIG. 15, there is shown a particular machine embodying the principles of the machine illustrated in FIGS. 1–14. As shown, the machine includes three main separate functional elements; a hydraulic programming means 200; a bank of actuator means 202 which are individually coupled to the hydraulic means through suitable fluid conduit means, and the operational elements performing the various functions to produce the composite contacts which are enclosed in a suitable vacuum chamber 30. Vacuum chamber 30 includes two sections: base portion 30' and cover 30''. The cover 30'' is connected to a frame 203 which is connected to a rotatable post 204 such that operational elements of the machine can be exposed when the cover is removed to the position shown by the dotted lines, for example. Sight means 206 permits the machine operator to view the operation of the machine.

The operational elements and the chamber 30 of the machine are carried on a base plate 95 which sets on a table or cabinet 208. The cabinet includes an instrument panel 210 having various meters, gauges and switches for controlling the operation of the machine. Also included as part of the machine are valve means 237 and 238 which are disposed between actuator means 202 and a particular element of the machine needing the additional control which the valves provide.

Figure 16:
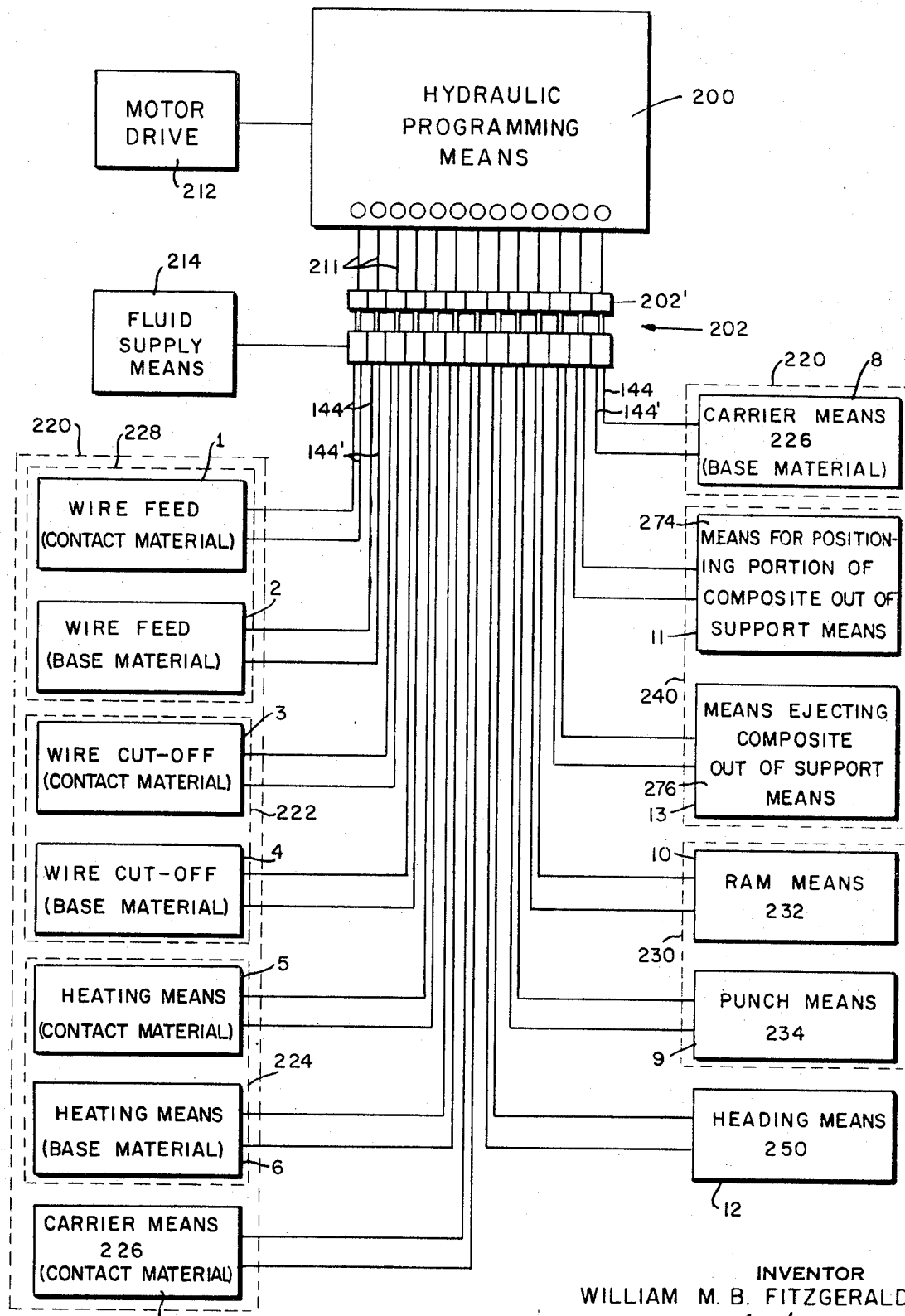
FIG. 16 is a flow chart showing the sequence of operations of the machine of FIG. 15.

Referring now to FIGS. 15 and 16, the relationship of the hydraulic programming means 200 and the actuator means 202 to the operational sequence of the machine can be described. In general, it can be said that the hydraulic programming means selectively energizes the actuator means, the actuator means in turn selectively operating the various functions of wire feeding, heating the wire, cutting the wire, etc. As shown, the actuator means includes a plurality of piston means 202', there being a piston for each functional element of the machine.

As more particularly shown in FIG. 16, hydraulic programming means 200 is coupled to the actuator means, the actuator means including a plurality of piston means 202'. The hydraulic programming means is coupled to a suitable motor drive means 212 through suitable connecting means 211. Hydraulic fluid is supplied to each of the piston means 202' under pressure from a suitable source 214. The operation of the hydraulic programming means and the actuator means will be described hereinafter in detail.

In accordance with the program "built-in" to the hydraulic programmer, the individual pistons of the actuator means are energized to supply fluid to the individual pistons controlling the operation of the individual elements of the machine through conduit means 144. Fluid from the individual pistons is returned to the pistons of the actuator means through conduit means 144'.

Figure 17:
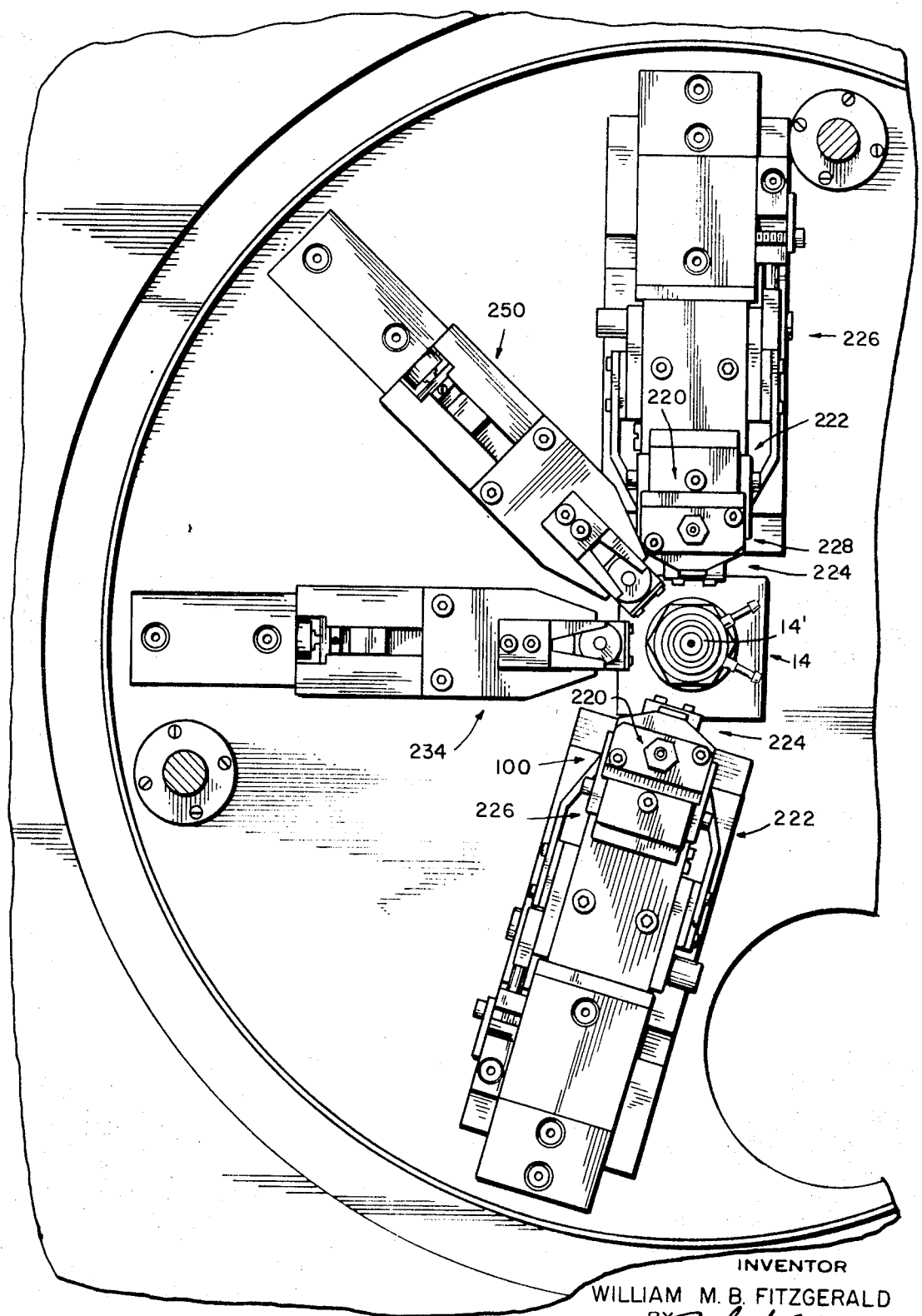
FIG. 17 is a partial top view of the machine of FIG. 15.

The hydraulic programming means 200 selectively energizes the actuator means 202 to selectively energize the individual piston means 202' according to a programmed sequence. Referring to FIGS. 2, 16 and 17, the various steps are carried out at the centrally located work station 14 which includes a support means 14'. In general, the wire supply means 220 is used to position predetermined lengths of wire in axial position over the centrally located support means 14'. Then means 230 (which includes weight 102 of FIG. 1) is used to transfer the wire into the support means against axial positioning means 240 so as to join the wires. Means 274 of axial positioning means 240 then moves at least a portion of the so formed composite out of the support means 14' such that a heading means 250 which includes tools 36 and 40 (of FIGS. 11 and 12) can form a predetermined shaped head on the composite. The headed composite is then forced out of the support means 14' by ejecting means 276 of axial positioning means 240.

More specifically, the step-by-step sequence is as follows: Pistons 1 and 2 are actuated through the corresponding movement of pistons in actuator means 202 to feed wires of contact material and electrically conductive material through wire feed means 228 to the cutting means 222 for cutting, heating means 224, and carrier means 226 for transferring cut lengths to the support means 14'.

It is noted that wire feed means 228, cutting means 222, and heating means 224 are similar in function to wire feed device 99 and 100, cutting means 31 and 32, and heater 33 shown with respect to FIG. 1. In steps 3 and 4, pistons are energized to actuate wire cutoff or shearing means 222. As the wires are cut, they are simultaneously moved by carrier means 226 to the heating means 224, and in steps 5 and 6, pistons are actuated to move the heating means 224 into engagement with the cut wires so as to heat the wires. In steps 7 and 8, pistons are energized so as to carry, through carrier means 226, the heated, cut wires to the centrally located work station 14 in axial alignment with support means 14'.

It is noted that in the present embodiment of the invention, the carrier means and the cutoff means are a single apparatus, there being two pistons to achieve the two functions of cutoff and carrying of the wires to the work station.

In step 9, a punch means 234 is brought into axial alignment between the wires and a ram means 232 by actuating a piston coupled to the punch means 234, punch means 234 being similar in function to guide assembly 98 of FIG. 1. In step 10, the piston of the ram means 232 is actuated to engage the punch means 234 against the wires and to force the wires into the support means 14' against the axial positioning means 240 of FIG. 2 and to join the wires to form a composite in the same continuous application of pressure. In step 11, a means 274 of the axial positioning means 240 is actuated to move at least a portion of the composite out of the support means 14' after which in step 12 a piston of the heading means 250 is energized to move the heading means into axial position between the composite and the ram means 232. Step 10 is then repeated to force the heading means against the composite to form a predetermined shaped head on the composite. Finally, in step 13, an ejecting means 276 of the axial positioning means 240 is actuated to force the headed composite out of the support means 14'.

It is noted that the means 230 for forcing the wires into the support means 14' is composed of a ram means 232 and a punch means 234. It should be understood that while the use of the punch means is preferred from the standpoint of damage prevention, the ram means alone may be used to force the wire into the support means.

It should also be understood that after a particular step has been performed, the piston for performing the step is returned to its "at rest" position through the actuator means 202.

Figure 18:
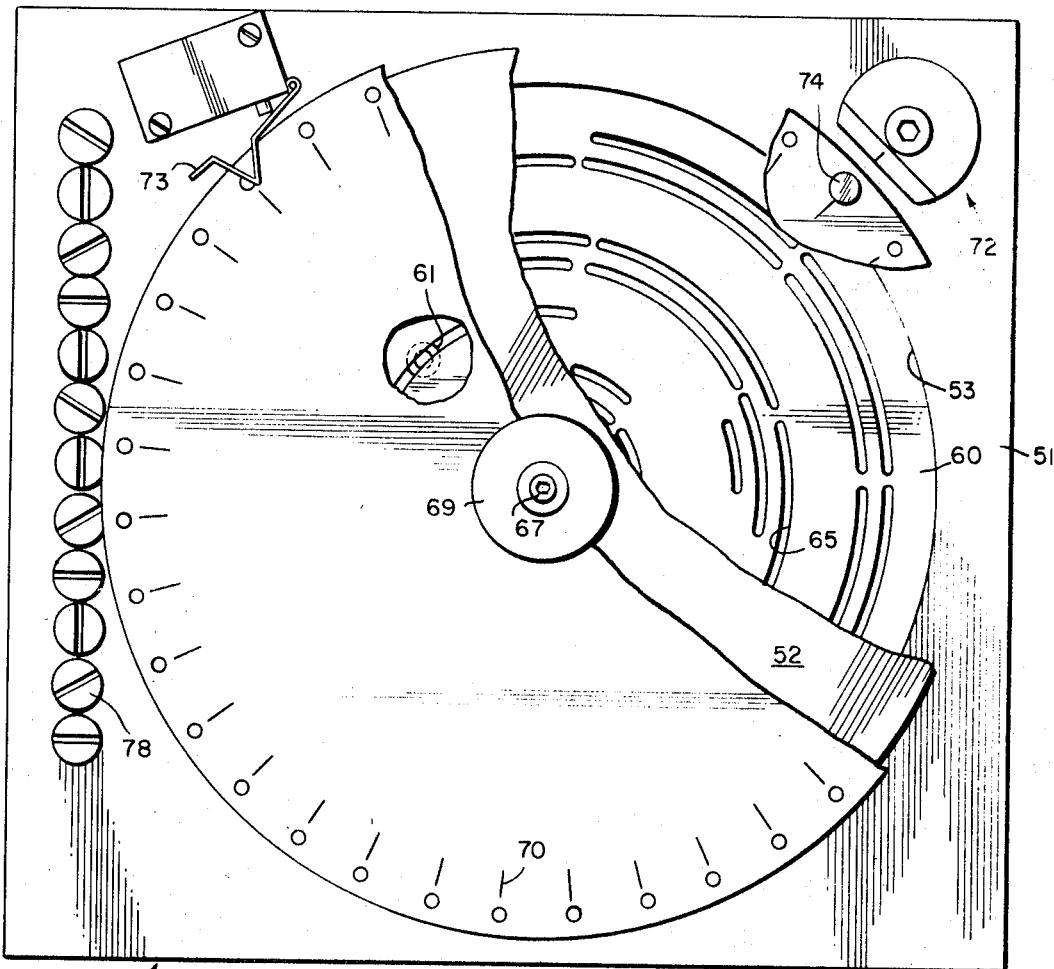
FIG. 18 is a plan view of the hydraulic programmer of the machine of FIG. 15 with portions thereof broken away.
Figure 19:
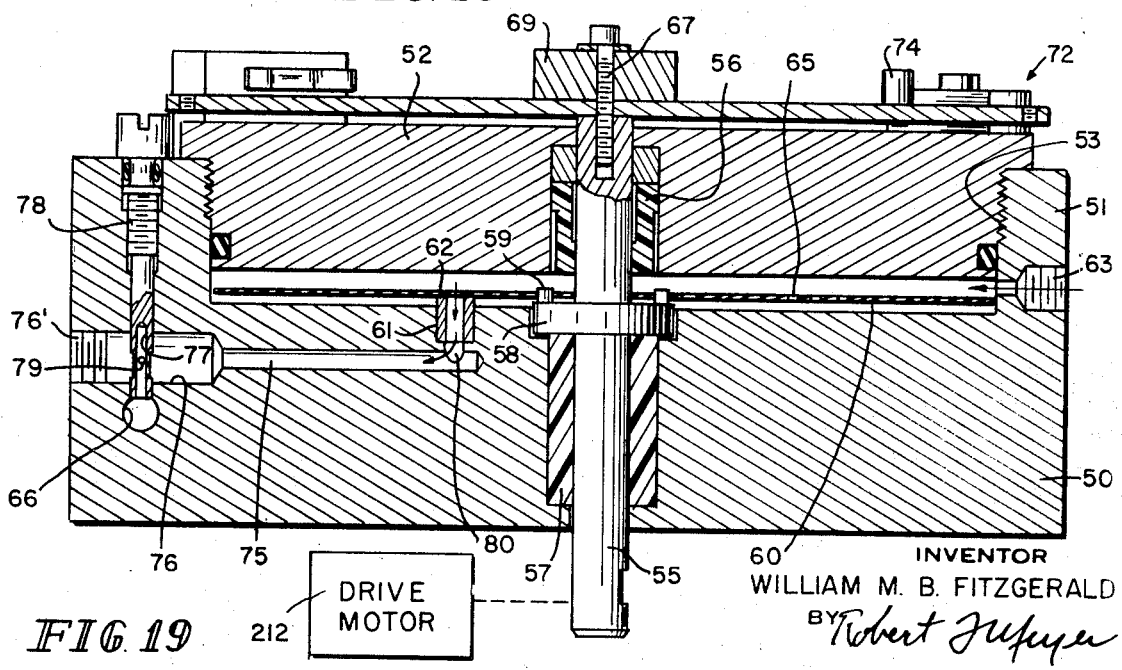
FIG. 19 is a cross section of the hydraulic programmer.

Referring now to FIGS. 18 and 19, there is shown the hydraulic programming means 200 for feeding hydraulic fluid to the individual actuator means 202 of the machine to energize the components in accordance with the previously described program sequence. A cup-shaped body member 50 having a lip portion 51 serves as the chamber or reservoir for a hydraulic fluid such as oil. The cover member 52 closes the open portion of the body member 50, the cover member engaging the body portion 50 through some suitable means such as threads 53. The cover portion 52 extends into the cup-shaped member 50 a predetermined depth so as to form a chamber 54 for the hydraulic fluid. The fluid is fed to chamber 54, under pressure, through inlet means 63. A rotatable shaft 55 extends through body member 50 and cover 52 through suitable apertures and is journaled therein through sleeves 56 and 57. In order to provide free rotation of the shaft 55, sleeves 56 and 57 are fabricated from a suitable Teflon-based material. Shaft 55 is driven by a suitable drive means 64. Included as part of shaft 55 is a collar 58 having studs 59 extending from one face thereof for carrying a substantially circular disc 60. One of such studs could be radially offset to provide positive location of the disc 60. Disc 60 rotates in accordance with the rotation of shaft 55 within the fluid chamber 54. Again, in order to insure free rotation of the shaft 55, collar 58 is fabricated of steel which is subsequently highly polished.

Disc 60 includes a plurality of apertures 65 in the form of elongated arcuate slots of varying lengths in accordance with the desired program. A corresponding number of apertures is formed from a plurality of cylindrical sleeves 61 extending from the body member 50. As shown, disc 60 "rides over" the face 62 of the sleeve 61 such that the arcuate slots of the disc is readily mated with the aperture formed in the sleeve when the slot comes into alignment with the sleeve. The pressure of the hydraulic fluid in chamber 54 substantially maintains the disc in close relationship with the sleeve 61. Additionally, to further aid in maintaining the disc in close relationship against the sleeve, a spring-biasing means disposed between the discs and cover 52 could be used.

As shown, there is a bolt 67 extending from and in axial alignment with shaft 55. Bolt 67 holds a disc 68 against the end 71 of the shaft 55 through cup 69. Thus disc 68 rotates in accordance with the rotation of shaft 55. Disc 68 serves as a template showing the relationship of the arcuate slots formed in disc 60. Disc 68 has indications 70 for proper setting of the template through indicator means 72. A suitable stop means such as spring means 73 engages stud means 74 to stop the disc rotation in a predetermined position when desired.

Included in cup-shaped member 50 are a plurality of bores 75 and 76 of different diameters formed within the body of the member 50. Suitable conduit means is connected to bore 76 through threads 76' for carrying fluid to the actuator means 202 (FIG. 16). Bolt 76 through bleed hole 79 adjusts the amount of flow to the actuator means. The fluid bled could be transferred back to chamber 54 through bore 66. Bore 75 is in communication with sleeve 61 through fitting 80.

Figure 20:
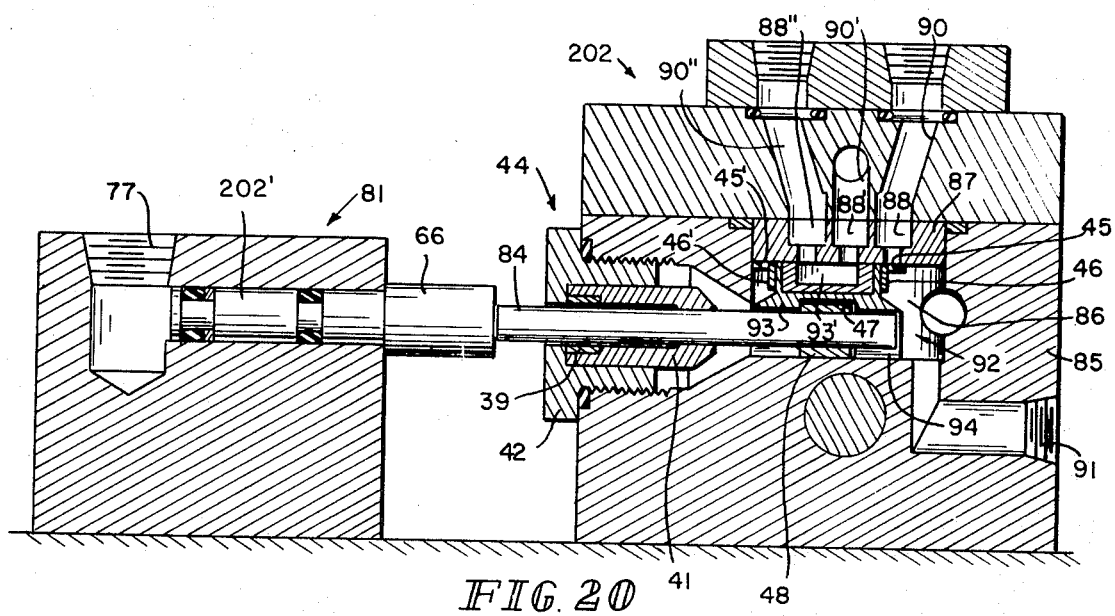
FIG. 20 is a cross section of the actuator means of the machine of FIG. 15.

In operation, a hydraulic fluid such as oil, is maintained within chamber 54 at a suitable pressure, for example, 1,000 p.s.i. Rotation of shaft 55 causes rotation of disc 60, the disc being rotated over the plurality of sleeves 61 and being maintained in close proximity to the sleeve through the oil pressure. When one of the arcuate slots 65 of the disc 60 becomes aligned with the sleeve 61, the hydraulic fluid passes from the chamber through the sleeve 61 to the bore 75 and then to bore 76. The hydraulic fluid then passes from bore 76 through suitable conduit means to hydraulic drive means 81 of actuator means 202 shown in FIG. 20. Referring to FIG. 20, drive means 81 serves to regulate valve means 82 which supplies hydraulic fluid to a predetermined component of the machine. Drive means 81 includes a piston means 202' which is energized from the fluid coming from bore 76 through inlet means 77. Piston 202' is adapted to engage piston rod 84 through sleeve 49.

As shown in FIG. 20, the cup-shaped block 85 forms a chamber or reservoir 86 for maintaining hydraulic fluid under pressure. Such fluid may be supplied under pressure through inlet means 91 there being a common inlet for the whole bank of actuators as shown in FIG. 15. The chamber 85 is partially closed by a cover means 87 having port holes or passages 88, 88' and 88'' for the passage of hydraulic fluid therethrough. A cover block 89 is disposed over the block 85 and the cover 87 to complete the valve assembly. Block 89 also includes port holes or passages 90, 90' and 90'', the passages being in alignment with the passages in the cover plate 87 for continuous passage of the hydraulic fluid. Port holes 90 and 90'' communicate with a piston means (not shown), the piston being the driving means of a particular element of the machine. As will be apparent, port hole 90' serves as a drain for hydraulic fluid. Disposed within chamber 86 there is shown a fluid-modulator means 92. The fluid-modulator means 92 controls the flow of fluid through the previously described ports. Fluid-modulator means 92 includes a cup-shaped member 93 having a yoke portion 94 extending from the base portion of the cup-shaped member, the yoke portion extending over piston rod 84 maintaining alignment between the rod and the cup-shaped member. The cup portion of the member 93 forms a passage 93' for communication between at least two of the ports 88' and 88'', for example. The member 93 is reciprocated within the chamber 86 in accordance with the movement of piston rod 84, the member 93 being cooperatively connected to the piston rod through collar 48 which is attached to the piston rod 84 and which extends into a notch or groove 47 formed in the member 93. A pair of angles 46 and 46' is attached to the cup-shaped member 93. Angles 46 and 46' have apertures 45 and 45' for the passage of hydraulic fluid therethrough. It should be understood that the angles 46 and cup-shaped member 93 could be formed as a single piece. Axial alignment of the piston rod 84 is maintained through guide means 44 which includes a support bolt 42 which carries a sleeve 41 and a bushing 39.

With the cup-shaped member 93 in the position shown, the operation of the actuator means is as follows: hydraulic fluid from chamber 86 passes through aperture 45 through ports 88 and 90 to the piston means of the particular element of the machine being actuated. Hydraulic fluid on the opposite side of the piston means being actuated passes through ports 90'' and 88'' through passage 93' to the drain port 90'. On the return stroke of the piston rod 84, hydraulic fluid from chamber 86 passes through aperture 45' through ports 88'' and 90'' to the piston means being actuated to drive the piston back thus forcing hydraulic fluid on the other side of the piston being actuated through ports 90 and 88 through passage 93' to the drain 90'. The fluid passing through drain port 90' could be conducted to the means supplying fluid under pressure to the chamber or reservoir 86 through inlet 91.

Figure 23:
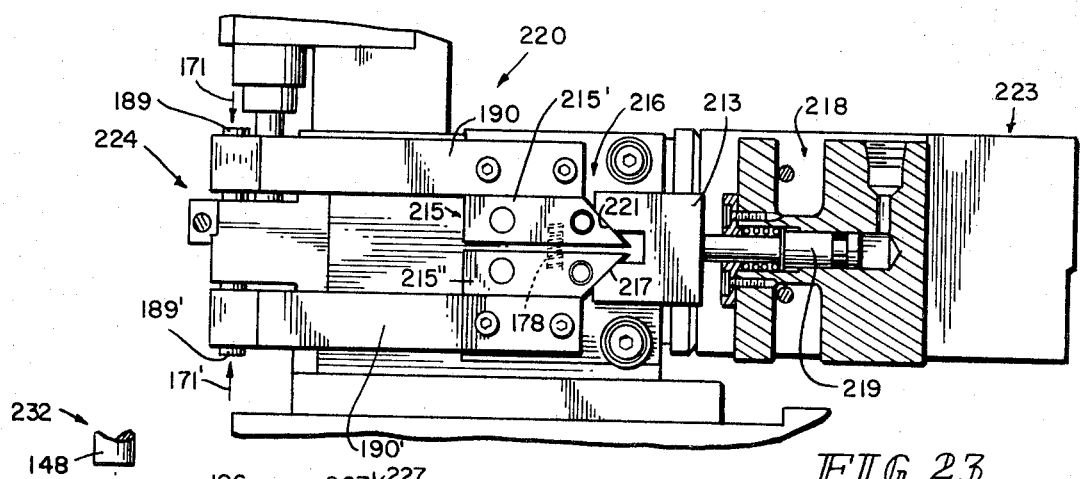
FIG. 23 is a side elevation of the carrier and heating means of the wire supply means.

Referring now to FIGS. 21–23, there is shown the means 220 for selectively supplying predetermined lengths of wire to the work station which includes the means 222 for shearing, means 224 for heating and carrier means 226 for transferring the materials for forming a composite rod to the work station 14 and means 228 for feeding the material to the shearing and heating means. In describing the means 220 for selectively supplying predetermined lengths of wire, only one of the means for one of the wire materials will be described, the means being substantially the same for both wire materials. The means 228 used to feed the material to the heating, shearing and carrier means includes two wire gripping means 150 and 150'. Both of the gripping means includes a split jaw 152 and 152' which are carried by spring-biased cups 153 and 153'. The cups are spring biased by suitable spring means such as coil springs 154 and 154'. The cup 153 axially moves within housing 156. The cup 153 includes a stem 159 extending from the cap 157. The coil spring 154 seats on member 160 which is integrally connected to housing 156. There is a bore 161 running through the cap portion 157, stem 159 and seat member 160.

Cup 153' floats within housing member 162. Coil spring 154' is seated on cup member 165 which is connected to housing 162. As shown, a bore 166 is formed in the cup 153'.

As shown, each of the split jaws 152 and 152' are adapted to engage roller means 167, 167', 168 and 168'. As will become apparent as the description proceeds, such roller means serve to open and close the split jaws 152 and 152'.

Gripping means 150 is slidably carried by slide block 158 and slides on surface 158'. Gripping means 150' is located at the lower extremity of housing 162 and is securely fastened thereto. Slide block 158 is slidably carried between support members 140 and 140'. Slide block 158 carries a spring means which includes a spring member 141 which provides frictional drag between slide block 158 and housing 156.

As is more clearly shown in FIG. 21, there is a hydraulic drive means 169 located above and in axial alignment with the gripping means 150 and 150'. Drive means 169 includes a piston 170. Hydraulic fluid for the piston is fed to the piston through suitable conduits (not shown), the fluid coming from actuator means 202 of FIG. 20. The piston rod 172 includes a centrally located bore. Disposed above the piston 170 there is shown a cap 173 which carries an adjustable stop bolt 174. Bolt 174 has a bore 175 formed along its central axis so as to be aligned with the bore formed in the piston rod 172. Piston 170 is coupled to slide block 158 through key means 176. A sleeve 177 interfits with the coil spring 154' and is in axial alignment with the bore 166 of the cup 153'. Sleeve 177 is connected to holding means 180. The sleeve 177 provides positive axial alignment for the wire being fed to the shearing means.

There is a shearing and carrier means 222, 226 slidably disposed between holding means 179 and 180. Carrier means 226 and shearing means 222 includes a blade 181 having an aperture 182 disposed at one end thereof. The blade 181 is driven by hydraulic drive means 183 which includes pistons 184 and 185 disposed in tandem with piston rod 186 to which the blade 181 is suitably connected. Hydraulic fluid is fed to the pistons of the drive means 183 through suitable conduits such as conduits 187 and 187'. Such hydraulic fluid is fed from actuator means 202 of FIG. 20. Also included as an element of the shearing and carrier means is heating means 224 which includes resistance heating electrodes 189 and 189'. Electrical power is supplied to the electrodes 189 and 189' through suitable means such as bus bars 190 and 190' and electrical conducting holding means 191 and 191'. Bus bars 190 and 190' also serve as holding and actuating means for the electrodes. With particular reference to FIG. 23, the holding means 190 and 190' are spring biased through coil compression spring 179 (FIG. 21) and are pivotally mounted such that the electrodes 189 and 189' can be squeezed toward each other as shown by arrows 171 and 171'. Such movement of the electrodes is accomplished through wedge means 216 which includes actuator member 213 and pivotally mounted follower means 215, and hydraulic drive means 218 which includes spring-biased piston 219. Follower member 215 includes a pair of pivotally mounted plates 215' and 215'' integrally connected to holding means 190 and 190' and having a ramp 217 adapted to mate a corresponding ramp 221 of actuator member 213. Previously noted compression spring 178 is connected to plates 215' and 215''. Actuator member 213 is coupled to piston 219 such that actuation of the piston actuates actuator member 213 to rotate plates 215' and 215'' against spring 178 which in turn spreads electrode-holding means 190 and 190' to move the electrodes 189 and 189' in accordance with arrows 171 and 171'. The hydraulic fluid for hydraulic drive means 218 is fed to the drive means from actuator means 202 of FIG. 20.

The operation of the wire supply means 220 follows: A wire length of one of the materials of the composite rod is hand fed through the bore 175 of adjustable stop bolt 174 through the bore of piston rod 172, then through the gripping means 150' and 150' through sleeve 177 to carrier blade 181. Carrier blade 181 is retracted and piston 170 is driven downward causing split jaws 152 and 152' to grip the wire and carry the required length of wire into aperture 182. Where required, the wire could abut against platen 151. The wire is then cut, and the cut length is heated and transferred to centrally located work station 14 in a manner hereinafter described. After the wire has been cut, heated and transferred, hydraulic fluid actuates piston 170 to drive it in an upward direction or away from the platen 151. Split jaws 152 and 152' grip the wire due to the wedging action of the split jaws 152 and 152' against roller means 167 and 167', 168 and 168' respectfully. Since rod 172 is coupled to housing 156, the housing is upwardly displaced; and since housing 156 is frictionally engaged with slide block 158 by way of spring 141, slide block 158 also starts to move upwardly leaving block 142. The slide block with housing 156 continues to travel until the opposite ends of block 158 abuts against cylinder nut 143, included as part of hydraulic drive means 169. At this point, housing 156 moves in slide block 158 by overcoming the frictional connection. At this point, a proper increment of material has been selected for the next feed as the stroke of piston 170 is limited by abutting adjustable stop bolt 174.

Piston 170 is driven downward and split jaw 152 is closed through roller means 167 such that the split jaws and the housing 156 and slide block 158 is carried downward with the wire. The wire is fed into aperture 182 for the next shearing, heating and transfer of wire operation. At this point, the travel of piston 170 is limited by cylinder nut 143 or by the wire abutting against platen 151.

Referring now to FIGS. 21 and 23, with the wire abutted against the platen 151, blade 181 is actuated through the movement of piston 185, the fluid to the piston being supplied from actuator means 202 of FIG. 20. The blade is actuated or moved a distance sufficient to shear the wire and to transfer the cut portion remaining the aperture into axial alignment with electrodes 189 and 189' of heating means 224. With particular reference to FIG. 23, the electrodes are squeezed towards each other to substantially abut against the cut wire length in the aperture, the electrodes being moved through the actuation of wedge means 216, the wedge means being actuated by hydraulic drive means 218. Again, the hydraulic fluid for the drive means 218 is fed from actuator means 202 of FIG. 20. It is noted that piston 219 is actuated forward to spread the electrodes so that blade 181 of FIG. 21 can be brought between the electrodes, then the fluid pressure to the piston is released to drive the piston back through spring tension so that the electrodes are squeezed towards each other through spring 178.

After the wire has been heated, electrodes 189 and 189' are spread and, referring to FIG. 21, piston 184 is actuated to drive blade 181 forward to carry the heated and cut wire to work station 14, the fluid for the piston being supplied by actuator means 202 of FIG. 20.

FIG. 21A illustrates an alternate form of the heating means 224. In this embodiment, the carbon electrodes 189 and 189' of FIG. 21 have been replaced with nonconsumable electrodes 278 and 278'. Such electrodes may be fabricated from a suitable material such as tungsten, steel, or molybdenum. The electrodes would be charged positively through suitable electrical means (not shown) while the blade 181 would be negatively charged through suitable electrical means (not shown). When electrical power is applied to the electrodes and the blade, a glow discharge will heat the blade and one of the cut wire lengths 194 (FIG. 25) to the desired temperature.

To promote the glow discharge the vicinity immediately surrounding the electrodes and the cut wires lengths is charged with a readily ionizable gas such as nitrogen or nitrogen-hydrogen mixture at a pressure less than atmospheric. To this end, and to electrically isolate the electrodes and the cut lengths, there is provided a chamber 28 formed by sleeves 282 and 282' fabricated from a suitable electrically insulative plastic. Electrically insulative bushings 284 and 284' form a substantially gastight fit with blade 181.

It should be understood that in using this embodiment, the electrodes 278 and 278' are stationary and consequently the wedge and hydraulic drive means of FIG. 23 need not be used.

Figure 25:
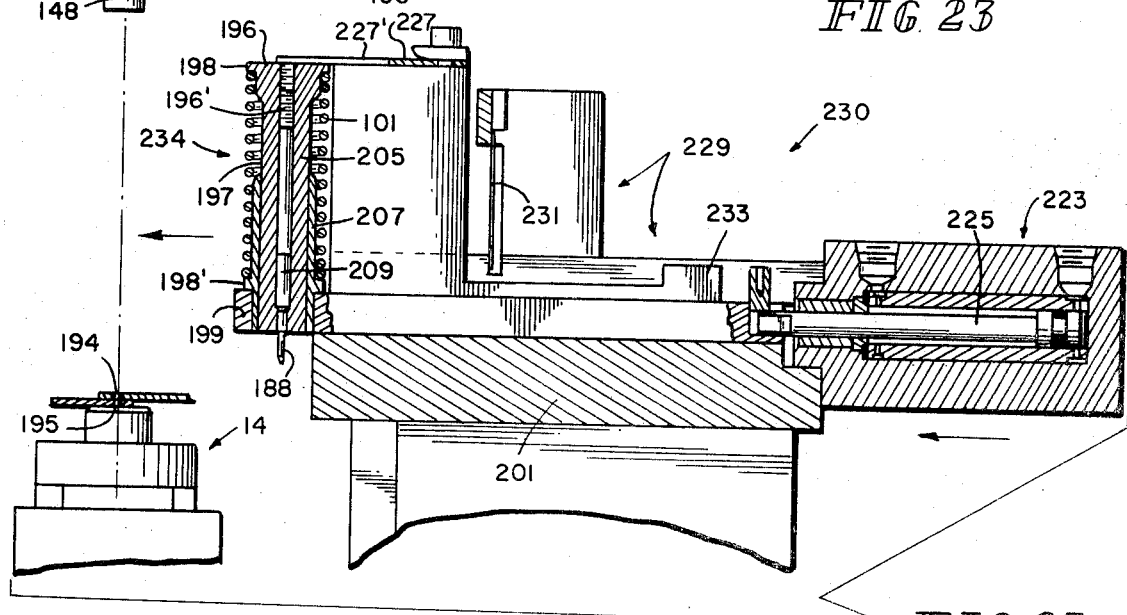
FIG. 25 is a cross section of the punch means of the machine of FIG. 15.

Referring now to FIGS. 24 and 25, there is shown the means 230 forcing the wires into the centrally located work station against the axial positioning means 240 of FIG. 2. Numeral 14 represents the centrally located work station which includes a support means or die 141 in which a composite rod is formed. In FIG. 24 there is shown the ram means 232 which engages the punch means 234 of FIG. 25. Ram means 232 is similar in function to the weight 102 of FIG. 1. Ram means 232 includes a piston rod 149 having at the business end thereof a reduced section serving as a hammer means 148 adapted to engage the punch means of FIG. 25. Rod 149 and its piston 147 are held within a suitable holding means 146 having bores 145 and 145' in which the piston and rod are actuated. Movement of piston 147 forces the hammer 148 to engage punch means 234 of FIG. 25 to force the materials into the die against the axial positioning means 250 of FIG. 2 and to subsequently join the materials to form the composite rod. In order to form the composite rod, pressures in the order of 100,000 to 200,000 p.s.i. need to be exerted against the materials. Moreover, such pressures need to be exerted very quickly. In addition, hammer means 148 should not be started from a position which is too close to the die 14 due to the needed available space for other tooling operations such as punch means 234. Consequently, not only are very high pressures needed very quickly but the piston rod 149 must have a relatively long stroke, for example, about 3 inches. Under such conditions, it has been found that if a purely hydraulic system were used to energize the piston rod, that excessive fluid leakage results on the return stroke. Such fluid leakage aside from being wasteful causes damage to the composite itself through fluid contamination. In the present invention these problems have been overcome by the use of a lever system.

As shown in FIG. 24, hydraulic fluid is fed to the ends of cylinder 123 through a suitable conduit 105. Such fluid is pressurized through the action of the previously described actuation means 202 of FIG. 20. Disposed within cylinder 123 there is shown a piston 126. Piston 126 slidably reciprocates within the cylinder against bushing 127. Lever means 128 is disposed between the cooperatively connects pistons 126 and 147 at fixed pivot means 129 and 130 respectively. The lever means is adapted to operate within cavity 124 formed by housings 192 and 193. Lever means 128 serves as a travel-multiplier means and includes a pair of crank arms 131 and 131', upper arms 132 and 132' and a pair of forearms 133 and 133'. Upper arms 132 and 132' are pivotally mounted at fixed pivot means 134 and 134' respectively and are pivotally connected to crank arms 131 and 131' at movable pivot means 135 and 135' respectively. The upper arms and the forearms 133 and 133' are pivotally connected to each other through movable pivot means 136 and 136'.

When the hydraulic fluid enters cylinder 123, piston 126 is axially displaced within the cylinder thus causing crank arms 131 and 131' to be axially displaced. An axial displacement of the crank arms causes the upper arms 132 and 132' to close due to the fixed pivot means 134 and 134' and the movable pivot means 135 and 135'. Such closing of the upper arms causes forearms 133 and 133' to close as the movable pivot means 136 and 136' are moved in the direction of the arrows. The closing of the upper arms and the forearms causes displacement of the piston 149 to thus cause displacement of the hammer means 148 toward the punch means 234 of FIG. 25. Using this system of levers a 3 inch stroke of the hammer means 148 is achieved through a three-tenths of an inch stroke of the piston 126.

A precise displacement of the hammer means 148 can readily be achieved by using suitable stop means such as for example, washer 137.

While it is not considered part of the ram means 232, there is shown in FIG. 24 a wire storage means 272 from which the wire for the composite is fed to the wire feed means 228 of FIG. 21. Wire storage means 272 includes a plurality of posts 138 disposed in a circular fashion forming a capstan about the ram means, the posts being structurally connected to housing 193. The wire 139 of both materials of the composite is selectively wound around the posts, from which they are fed to the wire feed means 228 of FIGS. 21 and 22.

Referring now to FIG. 25, there is shown the punch means 234 which the ram means 232 engages to force the cut and heated wires 194 and 195 into work station 14 against the axial positioning means 240 of FIG. 1. Such wires have been brought into axial alignment with the work station 14 through carrier means 226, shown in FIG. 21. Punch means 234 includes a sleeve 196 having a bore 196' and a reduced section 197 forming lip portions 198 and 198'. Sleeve 196 is integrally connected to holding means 199, holding means 199 slidably resting on block 201. Sleeve 196 includes two sections, an inner sleeve 205 and an outer sleeve 207, with sleeve 205 slidably engaged in sleeve 207. Inner sleeve 205 is spring biased through coil spring 101. As shown, there is disposed within the bore 196' a rod 209 having connected thereto a punch 188 adapted to engage wire 194 shown at station 14. It is noted that the end of punch 188 has a dome-shaped configuration adapted to form the cup-shaped portion 21' of FIG. 27. Setscrew 155 axially positions the rod 209 within the bore 196'. The punch means 234 is brought into axial alignment between the wires 194, 195 and the ram means 232 through hydraulic drive means 223 which includes a piston 225. Holding means 199, carrying rod 209 and punch 188 through sleeve 196 is connected to piston 225. Hydraulic fluid under pressure from actuator means 202 of FIG. 20 selectively forces the punch means 234 into such axial alignment.

When ram means 232 is actuated, the hammer means 148 of FIG. 24 engages sleeve 196 to force the sleeve and the punch toward the wire 194 such that punch 188 engages the wire 194 forcing it down into work station 14. After the wires 194 and 195 have been forced into work station 14 against axial positioning means 240 of FIG. 1, and the wires joined together, sleeve 196 rebounds back to its original position through coil spring 101. Excessive rebound is substantially prevented through spring means 227. Spring means 227 has a yoke portion 227' such that the hammer means 148 can come into engagement with sleeve 196.

It is noted that exact alignment between the punch 209 and the wires 194 and 195 is necessarily required. While the hydraulic drive means 223 substantially assures such alignment, there is also provided in the present punch means a means 229 for further assuring that such alignment is obtained. Means 229 includes a spring means 231 adapted to engage stop means 233 formed as part of holding means 199.

Figure 26:
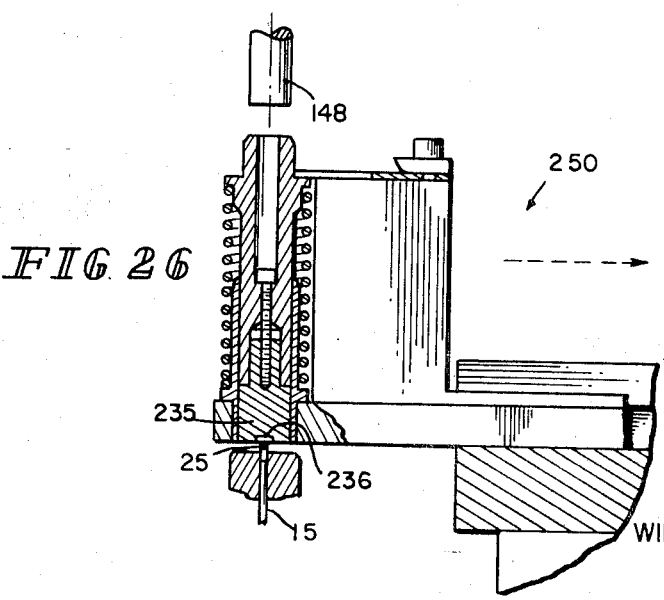
FIG. 26 is a cross section of the heading means of the machine of FIG. 15.

Referring now to FIG. 26, there is shown a heading means 250 for performing heading operations on the composite rod. Such heading operation is performed after a portion of the composite rod is forced out of support means or die 14' by means 274 which includes piston 20 of FIG. 2. It is seen that the heading means 250 is substantially similar in construction to the punch means 234, the principal difference being that of the header 235. Header 235 includes a die means 236 of predetermined configuration which when engaged with composite 25 forms a head of predetermined configuration. The operation of the heading means 250 is substantially the same as the punch means 234 of FIG. 25, the hydraulic drive means (not shown) bringing the heading means into alignment between composite 25 and hammer means 208 again being actuated through actuator means 202 of FIG. 20.

After the composites have been headed, it is ejected from support means or die 14' through ejecting means 276 which includes piston 111 of FIG. 2.

Figure 32:
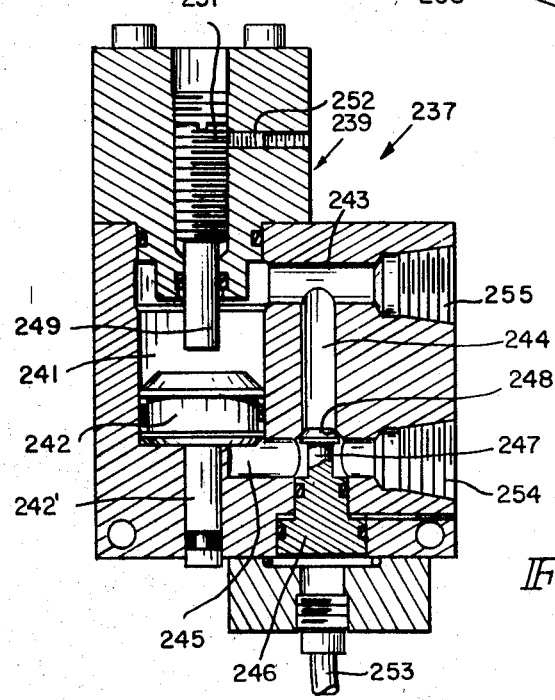
FIG. 32 is a cross section of another valve means used in the machine of FIG. 15.

Referring now to FIG. 32, there is shown valve means 237 of FIG. 15 which gives accurate control of the volume of the hydraulic fluid being sent to the element of the machine which it is energizing. In the present machine, such element is the ram means where such volume control is required. Valve means 237 includes a housing 239 having disposed therein a cavity 241 for piston 242, fluid conduits 243, 244 and 245, piston means 246 having extended therefrom valve stem 247 which is biased against valve seat 248. A piston means 242' is connected to piston 242 and is biased by being exposed to atmospheric pressure. Conduit 244 is in parallel with cavity 241 and serves as a bypass for the fluid when the fluid is returning or when the limiting effect of piston 242 is no longer required.

The travel of piston 242 is determined by stop means 249, the position of which is set by setscrew 251 with the set position being maintained by setscrew 252.

As previously noted, the present valve is used to accurately control the volume of the fluid disposed. Such control is achieved by the use of the parallel circuit of the conduit 244 and cavity 241. With the valve in the position shown, there is fluid in conduit 243, conduit 244 and in cavity 241 above the piston 242. Valve stem 247 will be seated in valve seat 248 by fluid pressure being applied against piston 246 through inlet means 253. Such fluid could, for example, be fed from another element of the machine in accordance with a programmed sequence. For example, in the present use of the valve where the valve is being used to control the volume of fluid to the ram means, the fluid coming to inlet 253 could be taken from the cutter means 222 of FIG. 21. There will also be fluid in conduit 245, the fluid being fed to inlet means 254 from actuator means 202 of FIG. 20. When actuator means 202 of FIG. 20 is actuated fluid flows to piston 242 moving the piston against stop means 249 to force fluid from conduit 243 to the ram means through outlet 255. When the volume of fluid through the ram means is no longer required, the pressure against piston 246 is released. Prior to, simultaneously or after, actuator means 202 of FIG. 20 releases the pressure to inlet 254 such that there will be less pressure in conduits 244 and 245. Residual fluid pressure of the system will be higher than atmospheric. The cross-sectional area of the top of piston 242 less than the cross-sectional area of the bottom of piston 242 being equal to the cross-sectional area of piston 242', and as the fluid pressure inside cavity 241 and conduit 245 is greater than the pressure below piston 242' the piston 242 will return to its "at rest" position and fluid flow through conduit 244 and 245 such that the fluid system falls to the residual fluid pressure and thus be ready for the next stroke of the ram. By using the parallel connection of the cavity 241 and conduit 244, the system can always be neutralized regardless of the positioning of the stop means 249.

Figure 31:
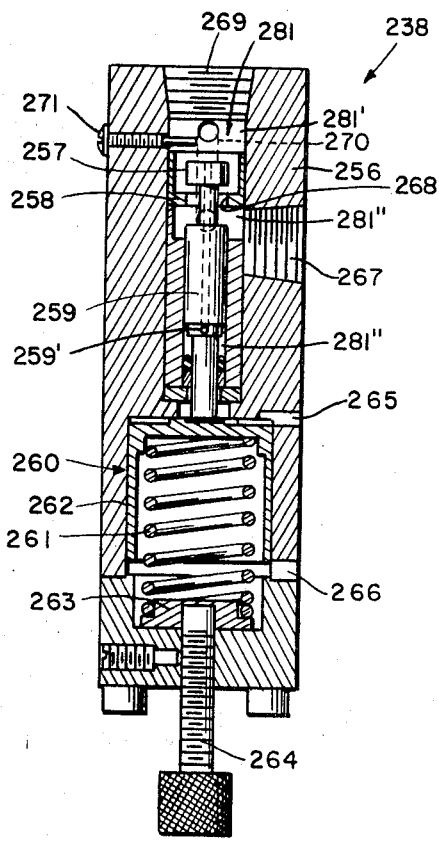
FIG. 31 is a cross section of a valve means used in the machine of FIG. 15.

Referring now to FIG. 31, there is shown valve means 238 of FIG. 15 which is used to control the pressure of the hydraulic fluid being fed to a particular element of the machine. In the present invention, such valve is used to monitor the pressure to the ram means 232 of FIG. 24. Such control of pressure is especially desirable in the ram means when the ram means is used to perform heading operations. More specifically, less pressure may be needed for heading than for joining the wires and with the use of the present valve means, such pressure may be achieved without altering the program period. Valve means 238 includes a housing 256 forming a valve chamber 281 having disposed therein a valve stem 257 which is adapted to fit into fluid flow-constricting means which includes cylinder 258 through aperture 268, at a relatively close fit. Valve stem 257 is connected to body member 259 which in turn is connected to spring-biased piston means 260. Cylinder 258 divides chamber 281 into an inlet chamber 281' and an outlet chamber 281". Spring-biased piston means 260 is biased by coil spring 261 which is disposed between cup-shaped member 262 and seats on base member 263. The strength of coil spring 261 is adjustable through setscrew 264. Entrapment of air is prevented in piston means 260 through air inlets and outlets 265 and 266. Bleed hole 259', communicating with outlet chamber 281', equalizes the pressure between the chamber and the fluid pressure in chamber 281".

The present valve effectively controls the pressure of the fluid being supplied by having the valve stem 257 float in relation to the cylinder 258. Fluid under pressure is supplied through inlet means 267, the fluid coming from actuator means 202 of FIG. 20. The fluid passes through aperture 268 formed in cylinder 258 to the outlet means 269 thence to the elements of the machine being actuated, in this case, ram means 232 of FIG. 24. When sufficient pressure is built up at the ram means, the pressure exerted against the valve stem 257 will be greater than the pressure of the fluid passing through aperture 268 and the pressure exerted by coil spring 261 such that valve stem 257 will engage cylinder 258. In practice, the valve stem 257 will float or "wobble" above the cylinder 258 to thus effectively reach an equilibrium pressure condition. Fluid pressure in outlet chamber 281' acting upon stem 257, after the forward cycle of fluid from inlet 267 is complete, is bypassed through conduit means 270. This prevents stem 257 from being held down against cylinder 258 which would prevent fluid passage from outlet 269 to inlet 267. Conduit means 270 includes a one-way valve means (not shown) allowing the fluid to pass as described, but not in the reverse direction. In addition, excessive travel of the stem 257 is prevented by setscrew 271.

Thus there is described a novel method and apparatus of forming electrical composite rivet-type contacts, the novel features of which are recited in the following claims. Additionally, the machine of the present invention includes elements which can be used in other hydraulic systems, the features of which are also recited in the claims.

I claim:

1. A method of forming a composite metal which comprises:
   a. feeding at least two wires of differing chemical composition and differing elastic limits at least one of which is an electrically conductive material and at least one of which is a base metal, to separate cutting and heating means;
   b. cutting said wires to a predetermined length and transferring said cut lengths to said heating means;
   c. preheating each of said cut electrically conductive metal wire and said cut base metal wire respectively to different preparatory bonding temperature;
   d. transferring said heated wires to a work station and aligning said wires at said work station in axial, abutting relation;
   e. transferring said wires into a confining space having a diameter slightly larger than the diameter of said wires by the application of pressure against said wires and continuing the application of said pressure so as to join said wires into a composite rod;
   f. forcing at least a portion of said composite out of said confining space;
   g. heading said portion extended out of said confining space; and
   h. thereafter ejecting said composite from said confining space.

2. A method according to claim 1 in which said composite metal is an electrical contact.

3. A method according to claim 1 wherein said cutting and transferring to said heating means is carried out in one sequence.

4. A method according to claim 1, wherein said heating means is resistance heating.

5. A method according to claim 1 wherein all of said listed steps are sequentially carried out in accordance with a hydraulically programmed sequence.

6. A method according to claim 1, wherein said heating is carried out by a glow discharge.

* * * * *